(12) United States Patent
Ikegami

(10) Patent No.: US 11,798,795 B2
(45) Date of Patent: Oct. 24, 2023

(54) MASS SPECTROMETER AND MASS CALIBRATION METHOD IN MASS SPECTROMETER

(71) Applicant: SHIMADZU CORPORATION, Kyoto (JP)

(72) Inventor: Masahiro Ikegami, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 746 days.

(21) Appl. No.: 16/967,160

(22) PCT Filed: Feb. 5, 2018

(86) PCT No.: PCT/JP2018/003760
§ 371 (c)(1),
(2) Date: Aug. 4, 2020

(87) PCT Pub. No.: WO2019/150576
PCT Pub. Date: Aug. 8, 2019

(65) Prior Publication Data
US 2021/0057200 A1    Feb. 25, 2021

(51) Int. Cl.
*H01J 49/00* (2006.01)
*H01J 49/16* (2006.01)
*G01N 27/623* (2021.01)

(52) U.S. Cl.
CPC ........ *H01J 49/0036* (2013.01); *G01N 27/623* (2021.01); *H01J 49/0004* (2013.01); *H01J 49/164* (2013.01)

(58) Field of Classification Search
None
See application file for complete search history.

(56) References Cited

U.S. PATENT DOCUMENTS

2009/0076737 A1 *  3/2009  Wang ............... G01N 33/6848
                                                  702/23
2009/0266980 A1   10/2009  Sano
                          (Continued)

FOREIGN PATENT DOCUMENTS

EP      3252798 A1   12/2017
JP   2010-205460 A    9/2010
                          (Continued)

OTHER PUBLICATIONS

Communication dated Jun. 29, 2021 by the Japanese Patent Office in application No. 2019-568541.
(Continued)

*Primary Examiner* — Hoon K Song

(57) ABSTRACT

A matrix-derived peak information acquisition unit (31) creates a peak list that summarizes various ions derived from a matrix and their theoretical m/z values based on a result of analysis of a sample of only a matrix, and stores the peak list in a matrix-derived peak information storage unit (32). When an actually-measured mass spectrum of a target sample is obtained, a mass calibration reference peak detection unit (33) uses a peak list corresponding to a matrix used for analysis to identify an ion peak derived from a matrix appearing in the actually-measured mass spectrum. A mass calibration information calculation unit (35) obtains mass calibration information from an actually-measured m/z value and a theoretical m/z value of the identified peak, and a mass calibration processing unit (37) uses the mass calibration information to correct an m/z value of a peak derived from a target compound on the actually-measured mass spectrum. In this manner, accurate mass calibration can be performed without using a standard substance or even in a case where an ion derived from a standard substance cannot be observed with sufficient intensity.

7 Claims, 8 Drawing Sheets

(56) References Cited

U.S. PATENT DOCUMENTS

2009/0302213 A1* 12/2009 Kuehl ............... H01J 49/0009
                                                250/281
2020/0300863 A1* 9/2020 Teramoto ............ H01J 49/0418

FOREIGN PATENT DOCUMENTS

| JP | 2014-59964 A | 4/2014 |
|----|--------------|--------|
| JP | 2015-146288 A | 8/2015 |
| JP | 2016-26302 A | 2/2016 |
| WO | 2007/055293 A1 | 5/2007 |
| WO | 2016/103388 A1 | 6/2016 |

OTHER PUBLICATIONS

Office Action dated Jan. 28, 2023 from the Chinese Patent Office in Application No. 201880088469.1.
International search report for PCT/JP2018/003760 dated Apr. 10, 2018.
Written opinion for PCT/JP2018/003760 dated Apr. 10, 2018.

* cited by examiner

Fig. 2

| m/z | TYPE OF ION |
|---|---|
| 137.0233 | M - H2O +H |
| 155.0339 | M + H |
| 159.0053 | M - H2O + Na |
| 174.9798 | M - H2O + K |
| 177.0158 | M + Na |
| 180.9872 | M -H2O -H +2Na |
| 192.9903 | M + K |
| 196.9611 | M - H2O -H + K + Na |
| 198.9978 | M - H + 2Na |
| 212.9351 | M - H2O - H + 2K |
| 214.9717 | M - H + K + Na |
| 230.9456 | M - H + 2K |
| 273.0394 | 2M - 2(H2O) + H |
| 291.0499 | 2M - H2O +H |
| 295.0213 | 2M - 2(H2O) + Na |
| 309.0605 | 2M + H |
| 310.9958 | 2M - 2(H2O) + K |
| 313.0319 | 2M - H2O +Na |
| 317.0032 | 2M - 2(H2O) - H + 2Na |
| 329.0064 | 2M - H2O + K |
| 331.0424 | 2M + Na |
| 332.9772 | 2M - 2(H2O) - H + K + Na |
| 335.0138 | 2M - H2O - H + 2Na |
| 347.0169 | 2M + K |
| 348.9511 | 2M - 2(H2O) - H + 2K |
| 350.9878 | 2M - H2O - H + K + Na |
| 353.0244 | 2M - H +2Na |
| 366.9617 | 2M - H2O - H + 2K |
| 368.9983 | 2M - H + K + Na |
| 384.9723 | 2M - H + 2K |

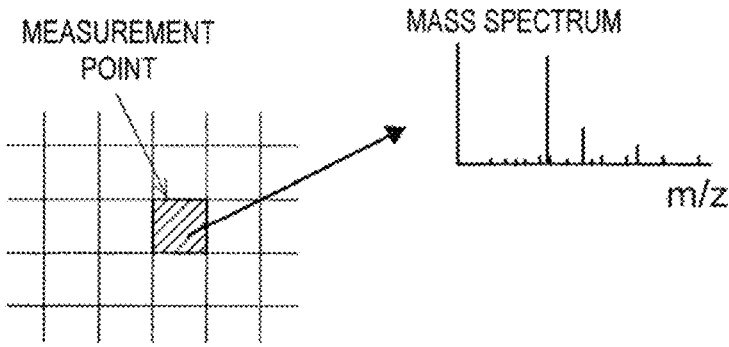
Fig. 10A
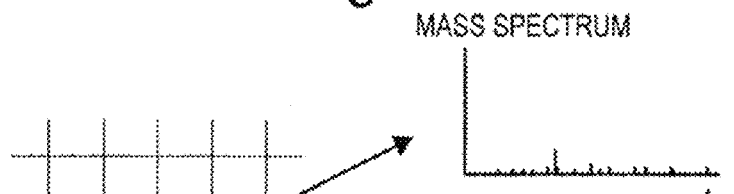
Fig. 10B
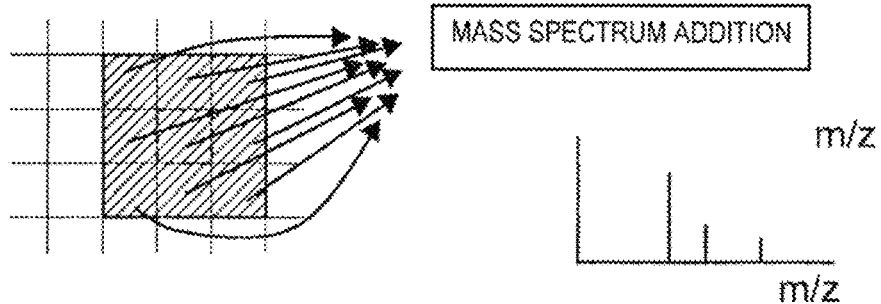

MASS SPECTROMETER AND MASS CALIBRATION METHOD IN MASS SPECTROMETER

CROSS-REFERENCE TO RELATED APPLICATIONS

This application is a National Stage of International Application No. PCT/JP2018/003760 filed Feb. 5, 2018.

TECHNICAL FIELD

The present invention relates to a mass spectrometer and a mass calibration method in the mass spectrometer, and, more specifically, to a mass spectrometer equipped with an ion source for performing ionization by adding or attaching a matrix, which is a type of an ionization assisting agent, such as Matrix Assisted Laser Desorption/Ionization (MALDI), and a mass calibration method in such a mass spectrometer.

BACKGROUND ART

In a mass spectrometer, due to various factors, a difference between a mass of compound obtained by actual measurement and its theoretical mass, that is, a mass deviation occurs. In a case of time-of-flight mass spectrometer (TOFMS), a variation in the extraction voltage of an ion for introducing an ion into flight space, a change in flight distance due to expansion or contraction of the device due to a temperature change are some of the main factors of the mass deviation. Further, in TOFMS (MALDI-TOFMS) equipped with a MALDI ion source, a flight distance changes due to an inclination of a sample plate on which a sample is placed and unevenness of a sample surface, causing a mass deviation. Further, in an imaging mass spectrometer that uses MALDI-TOFMS to perform mass spectrometry at a large number of measurement points in a two-dimensional measurement region on a sample, such a mass deviation differs at each position of the measurement points in the measurement region.

A general mass calibration method for correcting the mass deviation is a method using a standard substance whose theoretical mass is known. That is, a standard substance (or an appropriate compound whose theoretical mass is known) is added to a sample to be measured, and a peak derived from the standard substance is found from a mass spectrum obtained by mass spectrometry of the sample. Then, a correction amount is obtained so that a mass-to-charge ratio value of the peak matches with a mass-to-charge ratio value based on the theoretical mass. Then, based on this correction amount, a mass-to-charge ratio value of an ion derived from another compound observed on the mass spectrum is corrected (see Patent Literature 1, for example).

In the imaging mass spectrometer, a mass deviation amount and mass-to-charge ratio dependency of the deviation amount may differ depending on a measurement position on a sample as described above. However, a method of improving mass accuracy by performing mass calibration for each smaller range in a measurement region, instead of the entire measurement region has been known (see Patent Literatures 2 and 3, for example).

CITATION LIST

Patent Literature

Patent Literature 1: JP 2016-26302 A
Patent Literature 2: JP 2015-146288 A
Patent Literature 3: JP 2010-205460 A

SUMMARY OF INVENTION

Technical Problem

However, as described above, a mass calibration method using a peak derived from a specific compound such as a standard substance added to a sample has a problem described below.

In a case where a sample to be measured is a sample derived from an organism, in particular, if a large amount of some compound is added to the sample, it may affect ionization efficiency of a component in the sample and become a problem in accurate measurement. For this reason, generally, an amount of a standard substance added to a sample is small. On the other hand, when imaging mass spectrometry is performed with a mass spectrometer equipped with a MALDI ion source, the diameter of laser light emitted to one measurement point (micro area) is narrowed, and power of the laser light is also set to be relatively low in order to avoid damage to the sample around the measurement point. For this reason, the amount of ions generated at one measurement point is relatively small, and sometimes a peak of an ion derived from a standard substance added to a sample for mass calibration cannot be observed with a sufficient SN ratio. Furthermore, due to what is called an ion suppression effect and the like, there is a case where a peak of an ion derived from a standard substance cannot be practically observed.

When a peak derived from a standard substance is identified, a peak existing within a predetermined range centering the mass-to-charge ratio value determined based on the theoretical mass of the substance in a mass spectrum is regarded as a peak derived from the substance. However, particularly in imaging mass spectrometry, a sample such as a biological tissue section is often subjected to measurement without being pretreated, and in that case, a peak of an ion derived from a large number of compounds contained in the sample appear in a mass spectrum. The number of the peaks is so large that a peak derived from a compound contained in such a sample and a peak derived from a standard substance may be observed in extremely close proximity on a mass spectrum, or some or all of the peaks may overlap with each other. In such a case, a peak derived from another compound that is not a standard substance may be erroneously identified as a peak derived from a standard substance, or a peak derived from a standard substance having a mass-to-charge ratio that is deviated due to overlapping of a peak derived from another compound may be selected as a reference for mass calibration. In such a case, mass calibration is not performed properly, which will be a problem in identification of compounds in the sample.

The present invention has been made to solve the above problem, and a main purpose of the present invention is to provide a mass spectrometer and a mass calibration method in the mass spectrometer capable of performing accurate mass calibration without using a compound for mass calibration such as a standard substance, or even in a case where a peak of an ion derived from such a compound cannot be observed with a sufficient SN ratio or signal intensity.

Another object of the present invention is to provide a mass spectrometer and a mass calibration method in the mass spectrometer that can perform mass calibration by using another peak having higher reliability as a reference for mass calibration in a case where another peak exists in close proximity to a peak to be used as a reference for mass calibration on a mass spectrum, or in a case where another peak overlaps with the peak to be used as a reference for mass calibration.

Solution to Problem

A mass calibration method according to the present invention which is made to solve the above problem is a mass calibration method in a mass spectrometer including an ion source for ionizing a component in a sample by adding or attaching a matrix to the sample. The mass calibration method executes:

a) a mass calibration reference peak detection step of detecting, on a mass spectrum obtained by analysis of a target sample in the mass spectrometer, a peak derived from a matrix used in the analysis;

b) a mass calibration information calculation step of obtaining mass calibration information based on a difference between an actual mass-to-charge ratio value of a peak derived from a matrix detected in the mass calibration reference peak detection step and a theoretical mass-to-charge ratio value of an ion corresponding to the peak; and c) a mass correction execution step of correcting a mass-to-charge ratio for a peak observed in the mass spectrum using mass calibration information obtained in the mass calibration information calculation step.

A mass spectrometer according to the present invention made to solve the above problems is a device for performing the mass calibration method according to the present invention, and a mass spectrometer including an ion source for ionizing a component in a sample by adding or attaching a matrix to the sample. The mass spectrometer includes:

a) a reference information storage unit configured to store information on a theoretical mass-to-charge ratio of various ions derived from a matrix used in analysis by the mass spectrometer;

b) a mass calibration reference peak detection unit configured to acquire, from the reference information storage unit, information on an ion derived from a matrix used in analysis of a target sample by the mass spectrometer, and detect, on a mass spectrum acquired by the analysis, a peak corresponding to an ion derived from the matrix;

c) a mass calibration information calculation unit configured to obtain mass calibration information based on a difference between an actual mass-to-charge ratio value of a peak derived from a matrix detected by the mass calibration reference peak detection unit and a theoretical mass-to-charge ratio value of an ion corresponding to the peak; and d) a mass calibration execution unit configured to correct a mass-to-charge ratio for a peak observed in the mass spectrum using mass calibration information obtained by the mass calibration information calculation unit.

Here, the "ion source for ionizing a component in a sample by adding or attaching a matrix to the sample" is typically a MALDI ion source, an ion source using irradiation of a primary ion in a secondary ion mass spectrometry (SIMS) method, and the like. For example, in the MALDI method, various types of matrices are selectively used according to a type and a characteristic of a compound to be measured, the polarity of an ion, or other factors. Typical substances used as a matrix include 1,4-bisbenzene, 1,8,9-trihydroxyanthracene, 2,4,6-trihydroxyacetophenone, 2,5-dihydroxybenzoic acid, 2-(4-hydroxyphenylazo) benzoic acid, 2-aminobenzoic acid, 3-aminopyrazine-2-carboxylic acid, 3-hydroxypicolinic acid, 4-hydroxy-3-methoxycinnamic acid, trans-indole acrylic acid, 2,6-dihydroxyacetophenone, 5-methoxysalicylic acid, 5-chlorosalicylic acid, 9-anthracenecarboxylic acid, indoleacetic acid, trans-3-dimethoxy-hydroxycinnamic acid, α-cyano-4-hydroxycinnamic acid, 1,4-diphenyl butadiene, 3,4-dihydroxycinnamic acid, 9-aminoacridine, or the like.

In the field of mass spectrometry, a linear spectrum after centroid processing may be generally referred to as "mass spectrum". However, here, "mass spectrum" refers to a profile spectrum for which centroid processing is not performed.

Generally, since a matrix is a substance that is easily ionized, a peak derived from the matrix appears with a relatively large signal intensity on a mass spectrum. Further, ion peaks derived from various types of matrices including, not only an ion of a protonated molecule in which one proton is added to a molecule of a matrix or a deprotonated molecule in which one proton is desorbed, but also an ion in which a metal ion such as sodium (Na) and potassium (K) derived from impurities is added to a molecule of a matrix, an ion added with a combination of protons and those metal ions, and an ion in which a proton, a metal ion, or others is added to a polymer in which a plurality of molecules of a matrix are polymerized, appear on a mass spectrum. As described above, the number (types) of ion peaks derived from a matrix is large, and signal intensity of them is generally large. In view of the above, the mass spectrometer and the mass calibration method according to the present invention use such a peak derived from a matrix as a reference peak for mass calibration.

In the mass spectrometer according to the present invention, information on a theoretical mass-to-charge ratio of various ions derived from a matrix used in analysis by the mass spectrometer is stored in a reference information storage unit. Information on a type and a theoretical mass-to-charge ratio value of an ion for a matrix that is generally used may be, for example, acquired in advance by an experiment or the like by a manufacturer of the device and provided to the user. Further, as will be described later, necessary information may be automatically created based on a result of analysis on a matrix made by the user using the device and stored in the reference information storage unit. In any case, information on various types of matrices that may be used is preferably prepared in advance in the reference information storage unit (prior to analysis on a target sample).

As described above, in a case where information on an ion derived from a matrix is stored for various matrices in the reference information storage unit, if the user designates a matrix that is used when the analyzes the target sample, a mass calibration reference peak detection unit acquires information on an ion corresponding to the designated matrix from the reference information storage unit. Then, the mass calibration reference peak detection unit detects an ion peak derived from a matrix on an actually-measured mass spectrum obtained by analyzing the target sample, using the acquired information.

Specifically, for example, a detection window with a predetermined mass-to-charge ratio width is set for a theoretical mass-to-charge ratio value of peaks of various ions derived from a matrix, and a peak that enters the detection window may be regarded as an ion peak derived from the matrix. However, at that time, as will be described later, it is preferable to perform processing of excluding a peak estimated to be inappropriate as a reference for mass calibration or a peak with low reliability.

The mass calibration reference peak detection unit may detect only one ion peak derived from a matrix or may detect a plurality of ion peaks. A mass calibration information calculation unit uses one or a plurality of ion peaks derived from the detected matrix as reference peaks for mass calibration to calculate mass calibration information based on a difference between a mass-to-charge ratio value including a mass deviation actually measured for the ion peaks derived from the matrix and a theoretical mass-to-charge ratio value of an ion corresponding to the peak. Then, a mass calibration execution unit uses the calculated mass calibration information to correct a mass-to-charge ratio for each peak observed in the actually-measured mass spectrum to obtain a mass-to-charge ratio that is more accurate (close to a theoretical ratio). In this manner, a mass-to-charge ratio of an optional peak observed on the actually measured mass spectrum can be calibrated to a more accurate value.

Regarding a method of obtaining mass calibration information after one or a plurality of peaks as a reference for mass calibration are determined and mass calibration processing using mass calibration information, various conventional calculation methods used in a mass calibration method using an ion peak derived from a standard substance as a reference peak for mass calibration can be used.

In a case where the mass spectrometer according to the present invention includes an ion dissociation unit for dissociating an ion by a method such as collision induced dissociation (CID), and is configured to be able to perform mass spectrometry on a product ion dissociated in one or a plurality of stages in the ion dissociation unit, the mass calibration execution unit may calibrate a mass-to-charge ratio of an optional peak observed on a mass spectrum of the product ion, that is, $MS^n$ spectra (where n is an integer of two or more) based on mass calibration information.

In the mass spectrometer and the mass calibration method according to the present invention, various ions derived from the matrix can include an adduct ion, a multimer ion, and an adduct ion of the multimer.

As described above, the mass calibration reference peak detection unit detects an ion peak derived from a matrix on an actually-measured mass spectrum. However, a peak derived from a compound in a sample may appear in close proximity to or in a manner overlapping with an ion peak derived from a matrix. An ion peak derived from a matrix in such a state is inappropriate as a reference peak for mass calibration. In view of the above, in order to avoid selecting such an inappropriate peak as a reference peak for mass calibration, it is preferable to employ any one of aspects described below or a combination of a plurality of the aspects.

A first aspect of the mass spectrometer according to the present invention is characterized in that the mass calibration reference peak detection unit sets a detection window of a predetermined mass-to-charge ratio width for a theoretical mass-to-charge ratio value of a peak of a type of an ion derived from a matrix, and does not select a peak corresponding to the ion in a case where a plurality of peaks enter the detection window.

A second aspect of the mass spectrometer according to the present invention is characterized in that the mass calibration reference peak detection unit includes a peak singularity determination unit that determines, based on a peak width, whether or not another peak overlaps with a peak that is estimated as a peak corresponding to an ion derived from the matrix, and does not select a peak corresponding to the ion in a case where another peak is determined to overlap with the peak.

In general, a width of a peak appearing in a mass spectrum largely depends on a mass-to-charge ratio value of the peak and mass resolution of a device. Therefore, in a case where a peak has a width significantly larger than a standard peak width obtained from a mass-to-charge ratio value and mass resolution of a device, it is reasonable to infer that the peak is not a single peak, and a plurality of peaks having slightly different mass-to-charge ratio values overlap with each other. In view of the above, in the mass spectrometer having the above configuration, the peak singularity determination unit calculates a peak width of a peak on an actually-measured mass spectrum that is estimated as a peak corresponding to an ion derived from a matrix, and determines whether or not another peak overlaps with the peak by comparing the peak width with a threshold value depending on a mass-to-charge ratio value and the like.

This makes it possible to accurately determine whether or not a peak on a mass spectrum that seems to be one peak is overlapped with another peak, and avoid an inappropriate peak from becoming a reference peak for mass calibration.

A third aspect of the mass spectrometer according to the present invention is characterized in that the mass calibration reference peak detection unit includes a peak singularity determination unit that determines, based on a mass-to-charge ratio value corresponding to the center of gravity calculated from a plurality pieces of data constituting a peak and a mass-to-charge ratio value corresponding to a vertex of the peak, whether or not another peak overlaps with a peak that is estimated as a peak corresponding to an ion derived from the matrix, and does not select a peak corresponding to the ion in a case where another peak is determined to overlap with the peak.

In a case where a peak appearing in a mass spectrum is a single peak, generally, a shape of a peak waveform of the peak is bilaterally symmetric with respect to a vertical line passing through a vertex of the peak. For this reason, a mass-to-charge ratio value corresponding to the center of gravity of a peak and a mass-to-charge ratio value corresponding to a vertex of the peak substantially match with each other. On the other hand, when another peak having a different mass-to-charge ratio overlaps with a certain peak, bilateral symmetry of a peak waveform is broken, and therefore deviation between a mass-to-charge ratio value corresponding to the center of gravity of the peak and a mass-to-charge ratio value corresponding to a vertex of the peak becomes large. In view of the above, in the mass spectrometer having the above-described configuration, the peak singularity determination unit obtains the center of gravity of a peak from a plurality of pieces of data constituting the peak, and compares a difference between a mass-to-charge ratio value corresponding to the center of gravity and a mass-to-charge ratio value corresponding to a vertex of the peak with a threshold to determine whether or not another peak overlaps with the peak.

This makes it possible to accurately determine whether or not a peak on a mass spectrum that seems to be one peak is overlapped with another peak like the second aspect, and avoid an inappropriate peak from becoming a reference peak for mass calibration.

In the mass spectrometer according to the present invention, although it is desirable that information stored in the reference information storage unit be provided to the user from a device manufacturer, there may be a case where the user independently uses, as a matrix, a compound that is not generally used as a matrix.

In view of the above, the mass spectrometer according to the present invention may have a configuration of further including a reference information creation unit that is configured to create, based on a mass spectrum acquired by analysis of a matrix by the mass spectrometer, information on a theoretical mass-to-charge ratio of various ions derived from the matrix actually detected, and store the information in the reference information storage unit.

When a mass spectrum based on a result of mass analysis of a matrix prepared by the user by the mass spectrometer is obtained, the reference information creation unit detects a peak observed on the mass spectrum. Then, for example, based on a mass-to-charge ratio value of the peak and information on a matrix input by the user (chemical formula, theoretical mass, and the like), a type of ion of each detected peak (for example, a protonated ion, a Na-added ion, and the like) are identified. Then, a theoretical mass-to-charge ratio value is preferably calculated for an ion for which the type is identified, and reference information in which the ion species and the theoretical mass-to-charge ratio value are associated with each other is preferably created. Further, a theoretical mass-to-charge ratio value corresponding to each peak detected on a mass spectrum may be input by the user without automatic calculation.

In general, the "theoretical mass-to-charge ratio value" is preferably literally a mass-to-charge ratio obtained by theoretical calculation. However, in some cases, simple mass calibration using a time point at which the user analyzes a matrix as a reference is sufficient, that is, it is sufficient to correct only a mass deviation caused by a fluctuation of a device and the like from the time point used as a reference. In that case, the reference information creation unit may obtain a mass-to-charge ratio value of various ion peaks derived from a matrix actually detected on a mass spectrum, and regard the mass-to-charge ratio value as a theoretical mass-to-charge ratio value to create reference information.

In the mass spectrometer according to the present invention, an ion peak derived from a matrix is used as a reference peak for mass calibration. However, in a case where an ion peak derived from a standard substance added to a sample can be detected with a sufficient SN ratio and signal intensity, such a peak may also be used as a reference peak for mass calibration. In particular, in a case where a mass deviation amount differs depending on a mass-to-charge ratio, the larger the number of mass calibration reference peaks, the higher the accuracy of mass calibration. In view of the above, both an ion peak derived from a matrix and an ion peak derived from a standard substance may be used as a mass calibration reference peak.

The mass spectrometer and the mass calibration method according to the present invention are, as a matter of course, applicable to a configuration in which a compound in a sample spotted on a sample plate is ionized and mass analyzed by the MALDI method, and are also, as a matter of course, applicable to an imaging mass spectrometer.

The mass spectrometer according to the present invention may be a mass spectrometer that is capable of imaging mass spectrometry by performing mass spectrometry for each of a plurality of measurement points in a two-dimensional measurement region on a sample. Based on a mass spectrum acquired at each measurement point in a measurement region, the mass calibration reference peak detection unit, the mass calibration information calculation unit, and the mass calibration execution unit can be configured to perform mass calibration for a peak observed in a mass spectrum for each measurement point.

According to this configuration, mass calibration is performed at each measurement point in a measurement region on a sample. Accordingly, for example, even in a case where unevenness of a sample surface is relatively large and there is a difference in a mass deviation amount at each measurement point, excellent mass calibration is possible at any measurement point. This makes it possible to obtain highly accurate distribution information in a case, for example, a mass spectrometric image showing intensity distribution of ions at a specific mass-to-charge ratio value is created and displayed.

As a matter of course, in a case where an ion peak derived from a matrix cannot be obtained with a sufficient signal intensity in a mass spectrum obtained at one measurement point, a plurality of mass spectra obtained at a plurality of adjacent measurement points may be added, and an ion peak derived from a matrix observed on the added mass spectra may be used as a reference peak for mass calibration. Further, all mass spectra obtained at all measurement points in a measurement region may be added.

Advantageous Effects of Invention

According to the mass spectrometer and the mass calibration method according to the present invention, accurate mass calibration can be performed by using an ion peak derived from a matrix as a reference peak for mass calibration without using a compound for mass calibration such as a standard substance, or in a case where a peak of an ion derived from such a compound cannot be observed with a sufficient SN ratio or signal intensity.

According to a preferable configuration of the mass spectrometer according to the present invention, even in a case where an ion peak derived from a matrix to be used as a reference for mass calibration is overlapped with another peak and the peaks appear as one peak, instead of employing such a peak as a reference peak for mass calibration, an ion peak derived from another matrix having higher reliability with no overlapping of peaks can be used as a reference for mass calibration to perform mass calibration. In this manner, the accuracy of mass calibration can be further improved.

BRIEF DESCRIPTION OF DRAWINGS

FIG. 2 is a diagram showing an example of various ions derived from a matrix and theoretical mass-to-charge ratio values of the ions observed when DHB is used as the matrix.

FIGS. 10A-10B are explanatory views of processing in a case where an ion intensity derived from a matrix obtained at one measurement point is insufficient in the imaging mass spectrometric system of the present embodiment.

DESCRIPTION OF EMBODIMENTS

Hereinafter, an imaging mass spectrometric system, which is an embodiment of the mass spectrometer according to the present invention, will be described with reference to the accompanying drawings.

Figure 1:
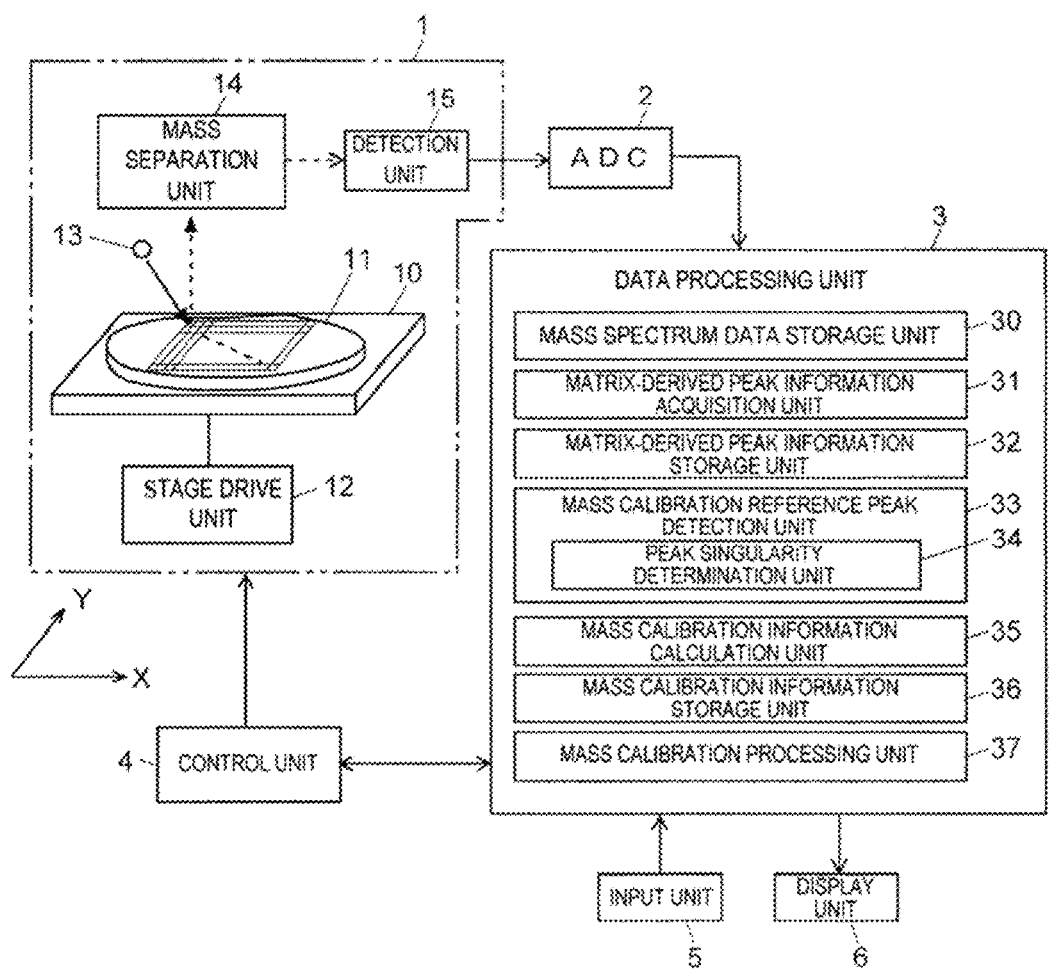
FIG. 1 is a configuration diagram of a main part of an imaging mass spectrometry system that is an embodiment of the present invention.

FIG. 1 is a configuration diagram of a main part of the imaging mass spectrometry system of the present embodiment.

The imaging mass spectrometry system of the present embodiment includes a measurement unit 1, a data processing unit 3, a control unit 4, an input unit 5, a display unit 6, and others.

The measurement unit 1 includes a sample stage 10 on which a sample 11 is placed, a stage drive unit 12 that moves the sample stage 10 in two axial directions of X and Y orthogonal to each other, a laser irradiation unit 13 for performing ionization by a MALDI (atmospheric pressure MALDI) method, a mass separation unit 14 that separates ions generated from the sample 11 according to a mass-to-charge ratio, and a detection unit 15 that sequentially detects ions separated by the mass separation unit 14. Here, the mass separation unit 14 is a time-of-flight mass separator. A detection signal output from the detection unit 15 is input to an analog-digital converter (ADC) 2, and data digitized by the analog-digital converter 2 is input to the data processing unit 3.

The data processing unit 3 includes functional blocks, such as a mass spectrum data storage unit 30, a matrix-derived peak information acquisition unit 31, a matrix-derived peak information storage unit 32, a mass calibration reference peak detection unit 33, a peak singularity determination unit 34, a mass calibration information calculation unit 35, a mass calibration information storage unit 36, and a mass calibration processing unit 37.

The substance of at least part of the data processing unit 3 and the control unit 4 is a workstation, which is a personal computer or a higher-performance computer, and dedicated control/processing software installed in such a computer operates on the computer, so that a function of each of the above functional blocks can be achieved.

Measurement operation of the measurement unit 1 of the imaging mass spectrometry system of the present embodiment will be described. Here, the sample 11 is a section cut out from a living tissue such as a mouse liver. A predetermined matrix is applied to almost the entire surface of the sample 11. Various compounds as exemplified above are used for a matrix for MALDI, and an appropriate matrix is selected according to a type of a substance to be measured and the polarity of an ion.

The stage drive unit 12 moves the sample stage 10 in an X-Y plane so that a predetermined measurement point in a measurement region on the sample 11 comes to an irradiation position with laser light emitted from the laser irradiation unit 13. When one measurement point to be measured is at an irradiation position with the laser light, the laser irradiation unit 13 irradiates the sample 11 with laser light in pulses. Then, a component in the sample 11 near the measurement point irradiated with the laser light is ionized with the help of a matrix. The generated ions are extracted from the vicinity of the sample 11 and introduced into the mass separation unit 14. Ions generated from the sample 11 are a mixture of ions having various mass-to-charge ratios. However, the ions are separated in the mass separation unit 14 according to the mass-to-charge ratios. Then, the ions reach the detection unit 15 in order from one having a smaller mass-to-charge ratio, and the detection unit 15 outputs a detection signal according to an amount of the incident ions.

This detection signal is digitized by the ADC 2 and input to the data processing unit 3. A series of data input to the data processing unit 3 within a predetermined time range from a time point of irradiation with the laser light is original data for creating a mass spectrum in the data processing unit 3. The input data is time-of-flight spectrum data showing a relationship between time-of-flight of ions and the signal intensity, and the time-of-flight is converted to a mass-to-charge ratio in the data processing unit 3, and the data is stored as mass spectrum data indicating a relationship between a mass-to-charge ratio of the ions and the signal intensity in the mass spectrum data storage unit 30.

When the measurement described above is finished for one measurement point, the stage drive unit 12 moves the sample stage 10 in the X-Y plane so that another measurement point in the measurement region comes to the irradiation position with the laser light. For all measurement points in the measurement region on the sample 11, by repeating the movement of the sample stage 10 (that is, the movement of the sample 11) and the analysis by irradiating with the laser beam, collection of mass spectrum data to create a mass spectrometry image of the entire measurement region is completed.

In the mass spectrometer that performs ionization by the MALDI method as described above, not only a component (compound) in the sample 11 but also various ions derived from a matrix are generated. Since many compounds originally used as a matrix are substances that are easily ionized, an amount of ions derived from a matrix is relatively large. For this reason, a peak of ions derived from a matrix appears on a mass spectrum with a relatively large signal intensity. Further, during ionization, in addition to ions of a protonated molecule in which one proton (H) is added to a molecule of a matrix and a deprotonated molecule in which one proton is desorbed, adduct ions, in which ions of Na and K existing as impurities are added to the above-mentioned protonated molecule or deprotonated molecule, or −H+2K and −H+2Na (where −H means that one proton is desorbed, +2K and +2Na mean that two K and Na ions are added), which are combinations of the above, are added. Further, H, Na, and K, or a combination of these, may be added to a multimer in which a plurality of molecules of a matrix are polymerized, and a specific molecule such as $H_2O$ from a matrix molecule and a multimer of the matrix molecule may be desorbed without having charge, and H, Na, and K, or a combination these may be added to the molecule.

FIG. 2 shows the summary of a type of an ion derived from a matrix that appears in a mass-to-charge ratio range of m/z 400 or less and a theoretical mass-to-charge ratio value of the ion in a case where 2,5-dihydroxybenzoic acid (DHB), which is very common, is used as a matrix. In FIG. 2, "M" represents a molecule of DHB, and "2M" is a dimer of DHB. As can be seen from this diagram, there are many types of ions derived from one matrix. Moreover, mass-to-charge ratios of these ions are different to the extent that they can be sufficiently discriminated at least by mass accuracy of a general mass spectrometer. Further, due to the influence of a compound contained in a sample, not all ion species derived from a matrix are observed at a sufficiently high signal intensity. However, at least some of them are observed at a sufficiently high signal intensity. In view of the above, in the imaging mass spectrometry system of the present embodiment, mass calibration is performed using a peak of an ion derived from such a matrix as a reference peak. Hereinafter, a procedure and processing of the mass calibration will be described in detail with reference to FIGS. 3 to 9.

[Creation of Peak List of Ion Species Derived From Matrix]

At an appropriate time point prior to analysis of a target sample, it is necessary to create, for a matrix used for the analysis, a peak list of ions derived from the matrix and store it in the matrix-derived peak information storage unit 32. As shown in FIG. 2, this peak list is a list of theoretical mass-to-charge ratio values (hereinafter, referred to as m/z values as appropriate) of various ion species derived from one matrix. However, as described above, there is possibility that various compounds are used as a matrix, and it is inefficient to create a peak list immediately before executing analysis. In view of the above, in general, it is preferable that the user prepares various matrices that are possibly used for analysis, and a peak list for each matrix is created and stored in advance based on a result of actual measurement of each matrix.

In the imaging mass spectrometry system of the present embodiment, the matrix-derived peak information acquisition unit 31 has a function of assisting the user in creating a peak list of matrix-derived ions as described above.

That is, when the user prepares a sample of a pure matrix only, the measurement unit 1 executes mass spectrometry on the sample under the control of the control unit 4, and the data processing unit 3 creates a mass spectrum based on data obtained by the analysis. In analysis for creating a peak list, it is desirable that an ambient temperature of a device, a power supply voltage, and the like be in a predetermined state in order to improve mass accuracy. Further, the user inputs at least a theoretical mass (precise mass) or a chemical formula from the input unit 5 as information on a compound of the matrix. In a case where a chemical formula is input, the matrix-derived peak information acquisition unit 31 calculates a theoretical mass from the chemical formula.

Peaks of various ions derived from a matrix appear in an acquired mass spectrum. The matrix-derived peak information acquisition unit 31 detects peaks in the obtained mass spectrum according to a predetermined algorithm and obtains an m/z value of each of the detected peaks. In this case, since each peak on the mass spectrum is an isolated single peak, either an m/z value corresponding to a vertex of a peak or an m/z value corresponding to a position of the center of gravity of a peak may be used. As described above, since there are many kinds of ions derived from a matrix, a large number of peaks are detected. An actually measured m/z value of each peak includes an error that depends on mass resolution of a device. However, if a device state is properly managed as described above, the error is small. In view of the above, the matrix-derived peak information acquisition unit 31 compares an m/z value of each detected peak with m/z values of various ion species calculated from a theoretical mass of a matrix to identify each peak as any of the ion species. Ion species derived from a matrix are preferably determined in advance by assuming various adduct ions as shown in FIG. 2, a multimer, an adduct ion of a multimer, desorption of specific substances such as $H_2O$, and the like.

By the above processing, ion species of each peak observed on an actually-measured mass spectrum for a matrix are known. Accordingly, the matrix-derived peak information acquisition unit 31 creates a peak list listing theoretical m/z values of ion species that are derived from an analyzed matrix and can be actually observed. Then, the created peak list is stored in the matrix-derived peak information storage unit 32 in association with a name of the matrix or an identifier. The work of identifying a peak on an actually-measured mass spectrum may be manually performed by the user by observing a mass spectrum displayed on the display unit 6, instead of being automatically performed. Further, a result of automatic identification may be modified or added by the user as appropriate.

As described above, the user analyzes each matrix that is possibly used for analysis one by one, creates a peak list of ion species derived from the matrix, and stores the peak list in the matrix-derived peak information storage unit 32.

A peak list of ions derived from a matrix that is very commonly used in the MALDI method, such as DHB and α-cyano-4-hydroxycinnamic acid (CACH), may be stored in the matrix-derived peak information storage unit 32 in advance in a stage where a device manufacturer ships the device, or may be provided as library software from a device manufacturer to the user later.

For more accurate mass calibration, an m/z value listed in a peak list is desirably a theoretical m/z value. However, in a case where it is sufficient to correct only the mass deviation due to a time-dependent change of a device from a reference time point such as an initial time point at which a device is introduced, a fluctuation of a power supply voltage, a fluctuation of the ambient temperature, or other factors, an actually-measured m/z value obtained when a sample containing only a matrix is analyzed may be considered to be close to a theoretical m/z value, and may be used as an m/z value described in the peak list. In that case, it is not necessary to calculate a theoretical m/z value of each ion species derived from a matrix.

Mass calibration of peaks derived from various compounds appearing in a mass spectrum of each measurement point obtained by performing the imaging mass analysis on the target sample 11 is performed by a procedure described below. In the analysis, the user designates a type of matrix used in the analysis from the input unit 5. At this time, for example, a list of matrices for which a peak list is stored in the matrix-derived peak information storage unit 32 is preferably displayed on a screen of the display unit 6, so that the user can select and instruct a matrix to be used from the list by using the input unit 5.

[Identification of Peaks Derived From Matrix in Mass Spectrum of Actual Sample]

The mass calibration reference peak detection unit 33 reads a peak list corresponding to the matrix selected and instructed as described above from the matrix-derived peak information storage unit 32. Then, from a large number of peaks observed in an actually-measured mass spectrum for one measurement point, a peak that falls within a detection window having a predetermined allowable width around each m/z value in the read peak list is selected. This allowable width is preferably determined according to mass accuracy of the measurement unit 1. The mass accuracy referred to here is a maximum amount by which a peak position (m/z value) of a mass spectrum deviates from a true value within a specific time range, temperature range, and power supply voltage fluctuation range.

Figure 3:
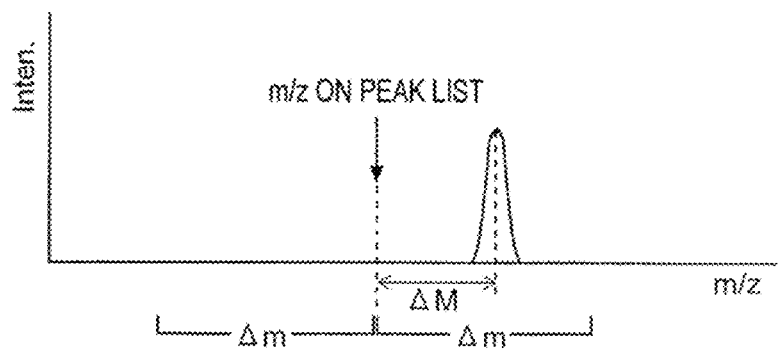
FIG. 3 is an explanatory view of processing operation when an ion peak derived from a matrix is detected in the imaging mass spectrometric system of the present embodiment (in a case of a single peak).
Figure 4:
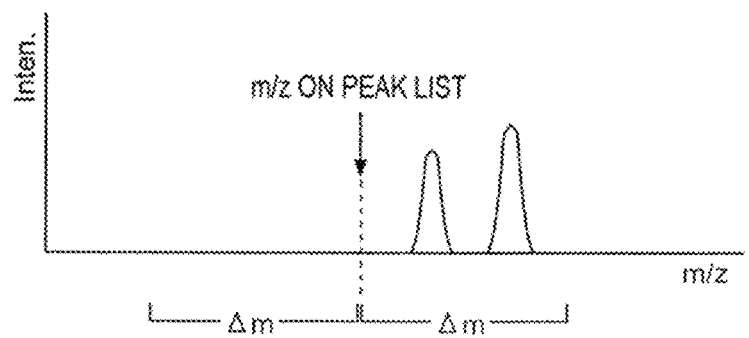
FIG. 4 is an explanatory view of processing operation when an ion peak derived from a matrix is detected in the imaging mass spectrometric system of the present embodiment (in a case of a plurality of peaks).
Figure 5:
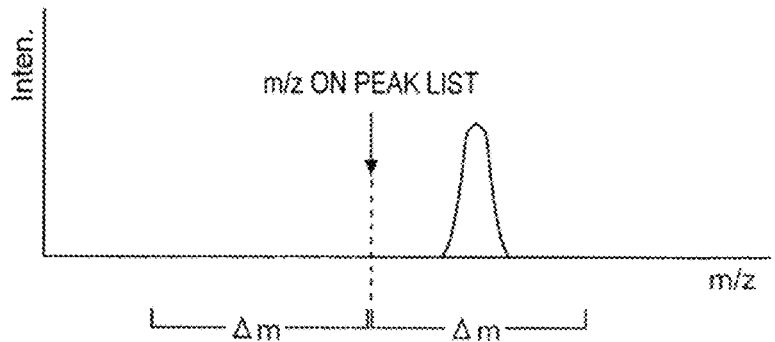
FIG. 5 is an explanatory view of processing operation when an ion peak derived from a matrix is detected in the imaging mass spectrometric system of the present embodiment (in a case where peaks overlap with each other and seem to be a single peak).

FIGS. 3 to 5 are conceptual diagrams for explaining peak detection operation. In FIGS. 3 to 5, a detection window of a width Δm is set in each of an increasing direction and a decreasing direction of m/z around an m/z value in a peak list. A large number of m/z values are listed in the peak list, and the processing of detecting a peak existing in a detection window is performed as described above for each of them. However, in cases below, the ion species (that is, the m/z value) in the peak list is excluded from a reference peak for mass calibration.

(A) A case where a plurality of peaks exist in the detection window.
(B) A case where one peak exists in the detection window, and the peak is estimated to be one in which a plurality of peaks overlap with each other.

FIG. 3 shows a case that does not correspond to any of the above (A), (B). In this case, one detected peak is identified as a peak of an ion species derived from a matrix, and employed as a reference peak for mass calibration. On the other hand, FIG. 4 shows a case corresponding to (A) above, and these peaks are not employed as a reference peak for mass calibration. As described above, it is easy to determine whether or not there are a plurality of peaks. On the other hand, the case of (B) described above is generally difficult to determine. In view of the above, here, in a case where the number of detected peaks is one as shown in FIG. 3 or FIG. 5, the peak singularity determination unit 34 uses any one of methods described below or a combination of a plurality of the methods to determine whether or not a detected peak that is seemingly one peak is an overlap of a plurality of peaks.

In the case of (A) above, among a plurality of peaks included in the detection window, one whose mass is closest to an m/z value in a peak list may be employed as a reference peak for mass calibration. Alternatively, one having a largest intensity value may be employed as a reference peak for mass calibration.

[Determination Processing for Peak Singularity Using Peak Width]

Figure 6A:
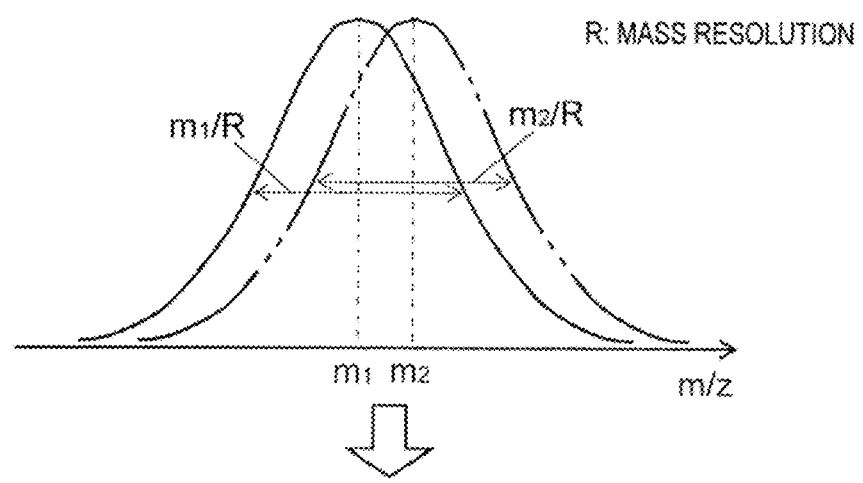
FIGS. 6A-6B are schematic diagrams for explaining a state where two peaks having slightly different m/z values and almost the same signal intensities overlap with each other.
Figure 6B:
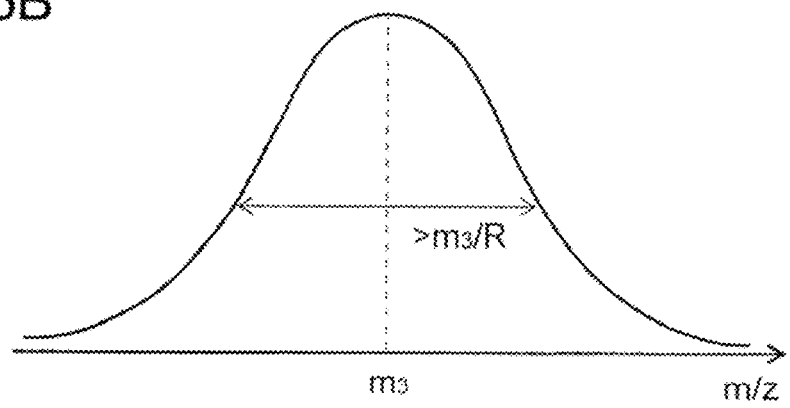
Figure 7:
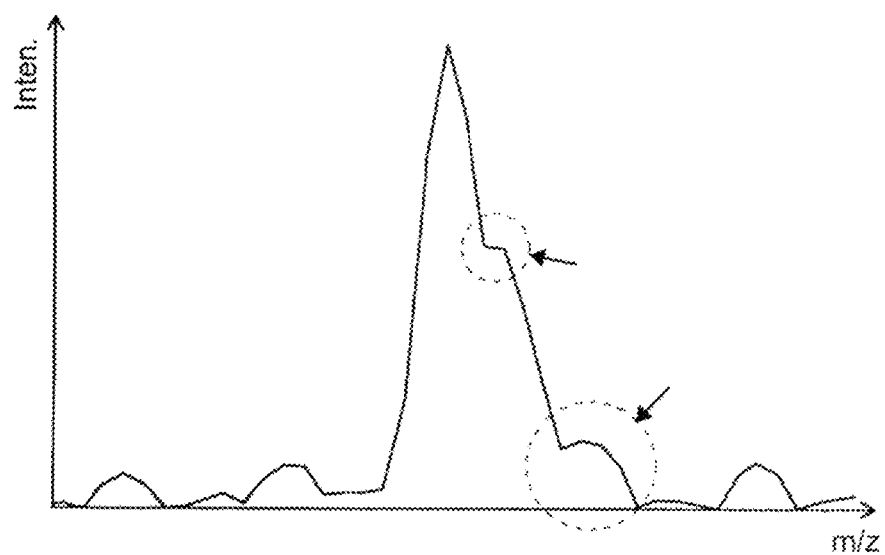
FIG. 7 is a schematic diagram for explaining a state where a plurality of peaks having slightly different m/z values and different signal intensities overlap with each other.

When two peaks with almost the same signal intensity value but slightly different m/z values overlap with each other on a mass spectrum as shown in FIG. 6A, there is a case where only one peak seems to exist as shown in FIG. 6B. Further, when a plurality of peaks having different signal intensity values are slightly shifted and overlap with each other, peak tailing and peak shoulders are observed as shown in FIG. 7. When a plurality of peaks overlap with each other in this way, the spread of the peaks is different from that of a normal peak, that is, a single peak. In view of the above, even for a peak that seems to be a single peak, it is possible to determine whether or not the peak is a pure ion peak derived from a matrix by using a width of the peak.

Generally, a peak width (full width at half maximum) is close to an m/z value of the peak divided by a value of mass resolution. For example, peak widths of two overlapping peaks in FIG. 6A are about $m_1/R$ and $m_2/R$ (where R is mass resolution). For this reason, a peak having a peak width significantly larger than this value can be determined as one in which peaks derived from a plurality of compounds overlap with each other. In view of the above, the peak singularity determination unit 34 calculates a peak width of one peak detected within a detection window. Then, whether or not the obtained peak width exceeds a threshold value obtained by adding a predetermined allowable value to a value obtained by dividing a theoretical m/z value of the peak by mass resolution R that is predetermined for the device (for example, $m_3/R$ in FIG. 6B) is determined. In a case where a peak width of an actual peak exceeds the threshold, the peak is determined not to be a single peak and is excluded from a reference peak for mass calibration.

A peak width may be obtained after executing smoothing processing on mass spectrum data to smooth a peak waveform shape.

[Determination of Peak Singularity by Using Difference Between Position of Peak Top and Position of Center of Gravity of Peak]

In general, a waveform shape of a single peak is often axisymmetric with respect to a vertical line passing through a peak top. On the other hand, as in the example shown in FIG. 7, in a case where two peaks having slightly different m/z values and different signal intensity values overlap with each other, the peak waveform shapes are asymmetrical. In a case where a waveform shape of a peak is asymmetrical, there is a difference between an m/z value corresponding to the center of gravity of the peak and an m/z value corresponding to a peak top. Therefore, by determining whether or not this difference is more than or equal to a predetermined threshold value, whether or not the peak is a single peak can be determined.

Depending on a device, there is also a case where a waveform shape of a peak is not symmetrical. However, even in that case, a peak waveform follows a predetermined distribution shape, and a difference between a position of a peak top and the center of gravity position, a value obtained by dividing the difference by a value of the center of gravity, and the like are almost constant. In view of the above, by determining whether or not such a value is equal to or more than a predetermined threshold value, it is possible to determine whether or not the peak is a single peak.

Specifically, the peak singularity determination unit 34 proceeds with the processing in a procedure described below.

In order to identify a peak top of a peak, the peak singularity determination unit 34 compares a signal intensity value of one specific data point within a predetermined m/z value range on a mass spectrum with a signal intensity value of data points before and after the specific data point to determine whether the signal intensity value increases or decreases before and after the specific data point. Then, the above determination is repeated while specific data points are shifted one by one within a predetermined m/z value range, and a specific data point where a signal intensity value turns from increasing to decreasing before and after one data point is found and determined as a peak top.

Figure 8:
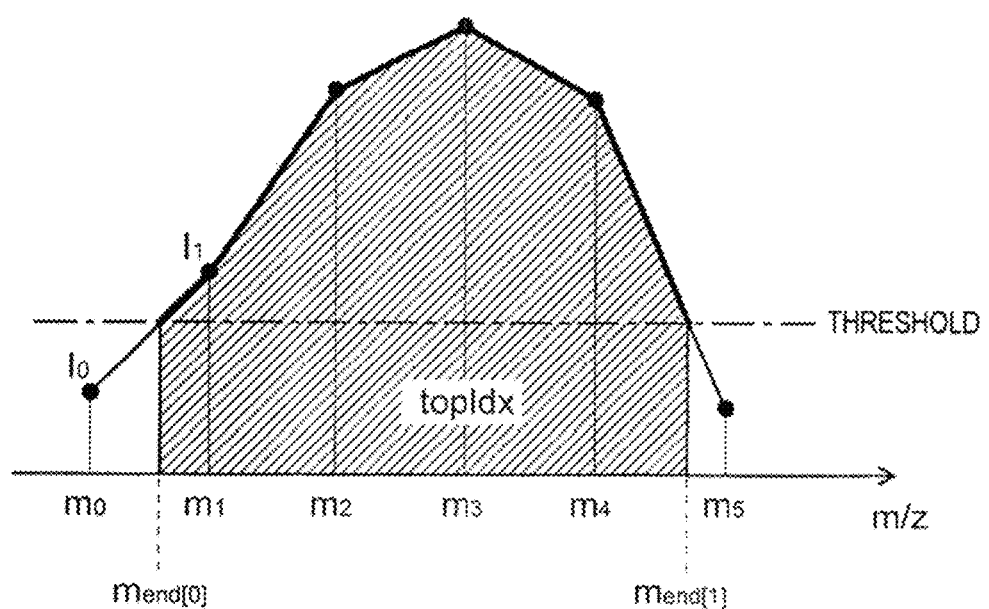
FIG. 8 is an explanatory diagram of processing for determining singularity of a peak in the imaging mass spectrometry system of the present embodiment.

In the example shown in FIG. 8, a data point where an m/z value is $m_3$ is a peak top.

Next, among a plurality of data points before and after the data point of the peak top, a data point having a signal intensity value of a threshold or more is extracted as a data point constituting the peak, where the threshold is obtained by multiplying a peak top signal intensity value topIdx by a predetermined coefficient (where the coefficient <1). In the example shown in FIG. 8, a data point with an m/z value of $m_1$ and a signal intensity value of $I_1$ is a data point that constitutes a peak, while a data point with an m/z value of $m_0$ and a signal intensity value of $I_0$ is excluded from a data point that constitutes a peak since $I_0$ is less than the threshold. Then, a shaded range in FIG. 8 between $m_{end[0]}$ and $m_{end[1]}$ of points where a threshold line that is parallel to the horizontal axis and a peak profile intersect is defined as a peak range, and the center of gravity position is calculated in the peak range. Then, an m/z value corresponding to the center of gravity position is obtained.

Figure 9A:
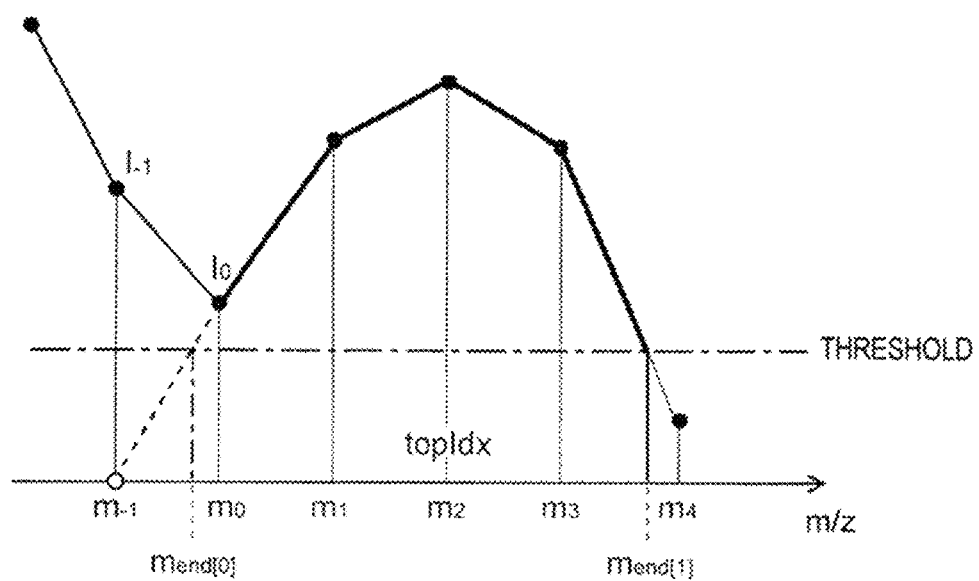
FIGS. 9A-9B are explanatory diagrams of processing of determining singularity of a peak in the imaging mass spectrometry system of the present embodiment.
Figure 9B:
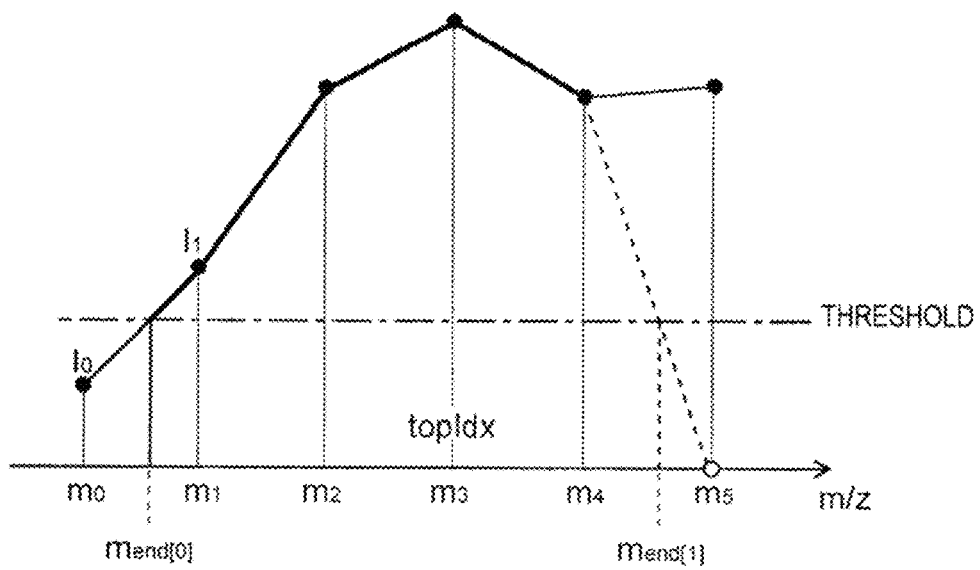

As shown in FIGS. 9A-9B, in a case where a signal intensity value of a data point at an end of a peak does not fall below the threshold due to overlapping of an adjacent peak and the like, as shown by a dotted line in FIGS. 9A and 9B, a signal intensity value of an adjacent data point where the signal intensity should decrease (a data point where m/z is $m_{-1}$ in FIG. 9B and a data point where m/z is $m_5$ in FIG. 9B) is regarded to become 0, and a peak profile is extrapolated. Then, an intersection of an extrapolation line and the threshold value is obtained, and the intersection is preferably set as an end of the peak range. As a matter of course, a method of determining the peak range for calculating the center of gravity position is not limited to that described here.

When an m/z value corresponding to the center of gravity position is obtained, the peak singularity determination unit 34 calculates a difference between the m/z value and an m/z value corresponding to a peak top, and determines whether or not the difference exceeds a predetermined allowable value. Then, in a case where the m/z value difference exceeds the allowable value, peaks are determined to overlap with each other, and the peaks are excluded from a reference peak for mass calibration.

Also in this case, the series of processing may be performed after smoothing processing is executed on mass spectrum data.

[Determination of Peak Singularity Using Probability Distribution of Peak Spread]

When a peak is a single peak, generally, a peak waveform of the peak can be approximated to predetermined probability distribution. In view of the above, the peak singularity determination unit 34 calculates probability distribution of the spread of a detected peak from a data point included in a predetermined m/z value range including the whole or part of the peak. Then, singularity of the peak is determined by determining whether or not the probability distribution can be regarded as following predetermined probability distribution.

The method for determining the singularity, that is, the purity of a peak is not limited to the one described above, and other conventionally known methods may be used. Further, it is usually difficult to accurately determine the singularity of a peak by one method, and therefore a plurality of determination methods are used in combination. For example, in a case where a peak is determined not to be a single peak by any of a plurality of the methods, processing of excluding the peak from a reference peak for mass calibration is preferably performed.

When one or a plurality of reference peaks to be used for mass calibration are determined among ion peaks derived from a matrix by the above-described processing, the mass calibration information calculation unit 35 calculates mass calibration information, for example, as described below.

That is, a relationship between an actually-measured m/z value of a compound and a theoretical m/z value of the compound can be approximated by, for example, following Equation (1):

$$\sqrt{\text{(actually-measured m/z value)}} = a \cdot \sqrt{\text{(theoretical m/z value)}} + b \quad (1)$$

A position of a reference peak detected by the mass calibration reference peak detection unit 33 is an actually-measured m/z value, and a theoretical m/z value of the peak is also known from a peak list. In view of the above, the mass calibration information calculation unit 35 applies them to Equation (1) to calculate coefficients a and b. In a case where there are two reference peaks, the coefficients a and b are preferably calculated by using Equation (1) as a simple linear equation. Further, in a case where the number of reference peaks is three or more, the coefficients a and b are preferably calculated by linear regression to Equation (1) using the least squares method. Alternatively, in a case where the number of reference peaks is three or more, an m/z range is divided into sections between each two adjacent reference peaks, and the coefficients a and b may be calculated from reference peaks at both ends in each of the sections. Further, in a case where there is only one reference peak, the coefficient a is preferably calculated with the coefficient b set to 0. The coefficients a and b obtained as described above are stored in the mass calibration information storage unit 36 as mass calibration information.

A relationship between an actually-measured m/z value and a theoretical m/z value of the compound differs depending on the principle of a mass spectrometer, and is not limited to Equation (1). However, an actually-measured m/z value can often be expressed by a polynomial of a theoretical m/z value. A coefficient of the polynomial is preferably determined from an actually-measured value of a reference peak. In a case where the number of reference peaks is smaller than the number of coefficients of the polynomial, coefficients are preferably determined in order from coefficients of higher-order terms and coefficients of low-order terms are preferably set to 0.

For an m/z value of a peak derived from a target compound (or an optional peak) observed on an actually-measured mass spectrum, the mass calibration processing unit 37 corrects the m/z value based on Equation (1) applied with the coefficients a and b to calculate a more accurate m/z value. This is a highly accurate m/z value in which mass deviation due to various factors is corrected.

In imaging mass spectrometry, a mass deviation amount often differs due to causes, such as a difference in the height of the sample 11 between each measurement point in a measurement region. Further, due to the non-uniformity of a matrix applied to the sample 11 and the influence of a component contained in the sample 11, there is a case where some ion species derived from the matrix cannot be observed at some measurement points. In view of the above, preferably, mass calibration information is obtained by performing the above-described processing on an actually-measured mass spectrum obtained for each measurement point, and, by using the mass calibration information, an m/z value of an ion derived from a target compound observed on the actually-measured mass spectrum is corrected.

On the other hand, in some cases, an ion peak derived from a matrix is not observed with sufficient signal intensity on an actually-measured mass spectrum obtained at one measurement point, and a reference peak cannot be detected by the mass calibration reference peak detection unit 33 (see FIG. 10B). In that case, as shown in FIG. 10B, mass spectra obtained at one measurement point and a plurality of measurement points adjacent to it (eight in this example) may be integrated, and the above-described processing may be performed for the integrated mass spectra to obtain mass calibration information. By using the mass calibration information obtained as described above, an m/z value of a peak observed on an actually-measured mass spectrum obtained at the one measurement point is preferably corrected. Alternatively, the configuration may be such that, for each measurement point, whether or not an ion peak derived from a matrix that can be employed as a reference peak for mass calibration exists with a predetermined signal intensity value or more is determined, and mass calibration information is calculated based on a mass spectrum of the measurement point alone in a case the ion peak exists, and mass calibration information is calculated based on a mass spectrum obtained by integrating mass spectra at a plurality of measurement points only in a case the ion peak does not exist.

The configuration may also be such that mass calibration information is calculated based on a mass spectrum obtained by integrating mass spectra at measurement points of an entire measurement region or at a plurality of measurement regions included in a region of interest designated by the user or set automatically in a measurement region, and, by using the mass calibration information, an m/z value of a peak on a mass spectrum at the measurement points of the entire measurement region or the measurement points included in the region of interest is corrected.

Not only an ion peak derived from a matrix but also other peaks, for example, an ion peak of a standard substance may be used as a mass calibration reference peak. For example, in a case where an ion peak of a standard substance is observed with sufficient signal intensity, the ion peak of the standard substance is used as a mass calibration reference peak, and in a case where the ion peak of the standard substance is not observed with sufficient signal intensity, an ion peak derived from a matrix may be used as a mass calibration reference peak. Alternatively, between an ion peak of a standard substance and an ion peak derived from a matrix, one having a larger signal intensity or one having a more excellent SN ratio can be used as a mass calibration reference peak. The user may be allowed to select which of an ion peak of a standard substance and an ion peak derived from a matrix is used as a mass calibration reference peak.

Although the above-mentioned embodiment is an example in which the present invention is applied to a mass spectrometer equipped with a MALDI ion source, a matrix may be used for assisting ionization in a method other than the MALDI method. For example, in the SIMS method, a solid sample is irradiated with a primary ion to ionize a component in the sample, and at this time, a matrix may be applied to the sample as in the MALDI method. Obviously, the present invention can be applied to such cases as well.

The above-described embodiment and various variations are merely an example of the present invention, and, as a matter of course, appropriate changes, modifications, and additions which are made within the scope of the gist of the present invention are also included in the scope of the claims of the present application.

REFERENCE SIGNS LIST

1 . . . Measurement Unit
10 . . . Sample Stage
11 . . . Sample
12 . . . Stage Drive Unit
13 . . . Laser Irradiation Unit
14 . . . Mass Separation Unit
15 . . . Detection Unit
2 . . . Analog-Digital Converter (ADC)
3 . . . Data Processing Unit
30 . . . Mass Spectrum Data Storage Unit
31 . . . Matrix-Derived Peak Information Acquisition Unit
32 . . . Matrix-Derived Peak Information Storage Unit
33 . . . Mass Calibration Reference Peak Detection Unit
34 . . . Peak Singularity Determination Unit
35 . . . Mass Calibration Information Calculation Unit
36 . . . Mass Calibration Information Storage Unit
37 . . . Mass Calibration Processing Unit
4 . . . Control Unit
5 . . . Input Unit
6 . . . Display Unit

The invention claimed is:

1. A mass calibration method in a mass spectrometer including an ion source for ionizing a component in a sample by adding or attaching a matrix to the sample, the mass calibration method in a mass spectrometer comprising:
   a) a peak detection step of detecting, on a mass spectrum obtained by analysis of a target sample in the mass spectrometer, a peak that is estimated to be derived from a matrix used in the analysis and determining reliability of the peak for peak selection;
   b) a mass calibration information acquisition step of obtaining mass calibration information based on a difference between an actual mass-to-charge ratio value of a peak derived from a matrix detected and selected in the peak detection step and a theoretical mass-to-charge ratio value of an ion corresponding to the peak; and
   c) a mass correction execution step of correcting a mass-to-charge ratio for a peak observed in the mass spectrum using mass calibration information obtained in the mass calibration information acquisition step.

2. A mass spectrometer including an ion source for ionizing a component in a sample by adding or attaching a matrix to the sample, the mass spectrometer comprising:
   a) a reference information storage unit configured to store information on a theoretical mass-to-charge ratio of various ions derived from a matrix used in analysis by the mass spectrometer;
   b) a mass calibration reference peak detection unit configured to acquire, from the reference information storage unit, information on an ion derived from a matrix used in analysis of a target sample by the mass spectrometer, detect, by using the information, on a mass spectrum acquired by the analysis, a peak that is estimated to correspond to an ion derived from the matrix, and determine reliability of the peak for peak selection;
   c) a mass calibration information calculation unit configured to obtain mass calibration information based on a difference between an actual mass-to-charge ratio value of a peak derived from a matrix detected and selected by the mass calibration reference peak detection unit and a theoretical mass-to-charge ratio value of an ion corresponding to the peak; and
   d) a mass calibration execution unit configured to correct a mass-to-charge ratio for a peak observed in the mass spectrum using mass calibration information obtained by the mass calibration information calculation unit.

3. The mass spectrometer according to claim 2, wherein the mass calibration reference peak detection unit is configured to set a detection window of a predetermined mass-to-charge ratio width for a theoretical mass-to-charge ratio value of a peak of a type of an ion derived from a matrix, and not to select a peak corresponding to the ion in a case where a plurality of peaks enter the detection window.

4. The mass spectrometer according to claim 2, wherein the mass calibration reference peak detection unit includes a peak singularity determination unit that determines, based on a peak width, whether or not another peak overlaps with a peak that is estimated as a peak corresponding to an ion derived from the matrix, and is configured not to select a peak corresponding to the ion in a case where another peak is determined to overlap with the peak.

5. The mass spectrometer according to claim 2, wherein the mass calibration reference peak detection unit includes a peak singularity determination unit that determines, based on a mass-to-charge ratio value corresponding to a center of gravity calculated from a plurality pieces of data constituting a peak and a mass-to-charge ratio value corresponding to a vertex of the peak, whether or not another peak overlaps with a peak that is estimated as a peak corresponding to an ion derived from the matrix, and is configured not to select a peak corresponding to the ion in a case where another peak is determined to overlap with the peak.

6. The mass spectrometer according to claim 2, further comprising:
a reference information creation unit that is configured to create, based on a mass spectrum acquired by analysis of a matrix by the mass spectrometer, information on a theoretical mass-to-charge ratio of various ions derived from the matrix actually detected, and store the information in the reference information storage unit.

7. The mass spectrometer according to claim 2, the mass spectrometer being capable of imaging mass spectrometry by performing mass spectrometry for each of a plurality of measurement points in a two-dimensional measurement region on a sample, wherein
based on a mass spectrum acquired at each measurement point in a measurement region, the mass calibration reference peak detection unit, the mass calibration information calculation unit, and the mass calibration execution unit are configured to perform mass calibration for a peak observed in a mass spectrum for each measurement point.

* * * * *